(12) United States Patent
Lee et al.

(10) Patent No.: US 7,034,914 B1
(45) Date of Patent: Apr. 25, 2006

(54) METHOD OF FORMING A SEAL PATTERN COMPRISING BENT PORTIONS CIRCUMVENTING A CONDUCTIVE CONTACT DOT FOR LIQUID CRYSTAL DISPLAY DEVICE

(75) Inventors: Sang-Seok Lee, Pusan (KR); Joung-Won Woo, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 88 days.

(21) Appl. No.: 09/653,202

(22) Filed: Aug. 31, 2000

(30) Foreign Application Priority Data

Sep. 1, 1999 (KR) .............................. 1999-36786

(51) Int. Cl.
*G02F 1/1339* (2006.01)

(52) U.S. Cl. ..................................................... 349/153
(58) Field of Classification Search ................ 349/153, 349/190, 149, 152
See application file for complete search history.

(56) References Cited

U.S. PATENT DOCUMENTS

| | | | | |
|---|---|---|---|---|
| 5,717,476 A | * | 2/1998 | Kanezawa | ................... 349/149 |
| 6,259,505 B1 | * | 7/2001 | Makino | ...................... 349/153 |
| 6,317,186 B1 | * | 11/2001 | Miwa et al. | ................ 349/153 |
| 6,636,192 B1 | * | 10/2003 | Saitoh | ......................... 345/87 |

FOREIGN PATENT DOCUMENTS

JP  11-174771  2/1999

* cited by examiner

*Primary Examiner*—Andrew Schechter
*Assistant Examiner*—Thoi V. Duong
(74) *Attorney, Agent, or Firm*—McKenna Long & Aldridge LLP

(57) ABSTRACT

The present invention discloses a method of forming a seal pattern of a liquid crystal display panel having a liquid crystal layer comprising the steps of: forming common electrodes over a first substrate; forming a plurality of conductive contact dots on the second substrate; forming a seal pattern along edges of the second substrate, said seal pattern having a plurality of triangular bent portions, the bent portions being bent toward inside of the second substrate; and forming a liquid crystal layer between first and second substrates.

23 Claims, 4 Drawing Sheets

METHOD OF FORMING A SEAL PATTERN COMPRISING BENT PORTIONS CIRCUMVENTING A CONDUCTIVE CONTACT DOT FOR LIQUID CRYSTAL DISPLAY DEVICE

CROSS REFERENCE

This application claims the benefit of Korean Patent Application No.1999-0036786, filed on Sep. 1, 1999, under 35 U.S.C.§119, the entirety of which is hereby incorporated by reference.

BACKGROUND OF THE INVENTION

1. Field of the Invention

The present invention relates to a seal pattern used in a liquid crystal display (LCD) device.

2. Description of Related Art

A typical LCD device comprises a LCD panel having upper and lower substrates that are spaced apart from and opposed to each other, and an interposed liquid crystal layer. The upper substrate includes a common electrode, and the lower substrate includes switching elements, such as thin film transistors (TFTs), and pixel electrodes.

As a brief explanation about the manufacturing process of a liquid crystal cell of a liquid crystal panel, the common electrode and the pixel electrodes are respectively formed over the upper and lower substrates. A seal pattern is formed over the lower substrate, and then the upper and lower substrates are aligned and spaced apart from each other so that the common electrode of the upper substrate and the pixel electrodes of the lower substrate are opposed. A liquid crystal is then injected into the gap between the upper and lower substrates through an injection hole. The injection hole is then sealed, and finally, polarizing films are attached to the outer surfaces of the upper and lower substrates.

In operation, the amount of light passing through a liquid crystal cell is controlled by an electric field formed by the pixel and common electrodes such that characters or images are produced due to a light shutter effect.

The liquid crystal cell manufacturing process has few repeated steps. The overall process is divided into an orientation film forming process, a cell gap forming process, and a cell cutting process that produces cells of a desired size.

Referring now to FIG. 1, a typical liquid crystal cell manufacturing process will be explained in detail.

As shown in FIG. 1, the first step is to form an array of thin film transistors and corresponding pixel electrodes on the lower substrate.

The second step is to form an orientation film over the lower substrate by uniformly depositing a polymer thin film on the lower substrate, and then uniformly rubbing the polymer thin film with a fabric.

The rubbing process is performed by rubbing the surface of the polymer thin film in a proper direction with the fabric so as to establish the orientation direction of the liquid crystal. A typical orientation film uses an organic thin film, such as a polyimide thin film.

The third step is to print the seal pattern over the upper substrate.

Due to the seal pattern, after attaching the upper and lower substrates, a space for interposing the liquid crystal is formed. The seal pattern also ensures that the interposed liquid crystal doesn't leak out of the liquid crystal cell. A thermosetting plastic and a screen-print technology are conventionally used for the seal pattern.

The fourth step is to scatter spacers over the lower substrate.

The spacers have a definite size and maintain a precise and uniform spacing between the upper and lower substrates. Accordingly, the spacers are scattered throughout the lower substrate at a uniform density via either a wet spray method of spraying spacers mixed with an alcohol, or a dry spray method of spraying only the spacers.

Further, the dry spray method is divided into a static electric spray method that uses static electricity, and a non-electric spray method that uses gas pressure. Since static electricity it detrimental to the liquid crystal, the non-electric spray method is widely used.

After scattering spacers, in the fifth step, the upper substrate having color filters and the lower substrate having the thin film transistor array are aligned and attached to each other.

An aligning margin, which is less than a few micrometers, has an important role in the aligning and assembling process. If the two substrates are aligned and attached beyond the aligning margin, light leaks away such that the liquid crystal cell doesn't have a desired display quality.

In the sixth step, the liquid crystal cell fabricated through steps 1 to 5 is cut into unit cells. Conventionally, the liquid crystal is injected into the spacing between the upper and lower substrates, and then the liquid crystal cell is cut into a plurality of unit cells. But for larger displays, the liquid crystal cell is cut into unit cells before the liquid crystal is interposed. After cutting, the liquid crystal then is injected into the individual unit cells.

The process of cutting comprises a scribing process of marking lines on the substrate using a diamond pen, which is harder than the glass substrate, and then a breaking process of cutting the substrate using force (or pressure) along the marked lines.

The seventh step is injecting the liquid crystal into the unit cell.

Since a unit cell has a few square centimeter surface area and only a few micrometer gap, a vacuum injection process of injecting the liquid crystal that uses a pressure difference is effectively and widely used.

Now, referring to FIG. 2, a screen-print method for applying the seal pattern according to the third step is explained in more detail.

The screen-print method is facilitated using a patterned screen 6 and a squeegee 8.

To interpose the liquid crystal without leakage, the seal pattern 2 is formed along the substrate 1 near the edges, and an injection hole 4 for injecting the liquid crystal is formed.

To form the seal pattern 2, a thermosetting plastic having embedded spacers to maintain the gap between the two substrates is distributed on the substrate 1. Thereafter, a solvent in the sealant is evaporated, leaving a level surface.

In forming the seal pattern, the uniformity in thickness and in width of the sealant is very important to maintain a uniform spacing (or gap) between the two substrates.

For the seal pattern 2, a thermosetting or an ultraviolet-setting epoxy resin or the like is conventionally employed. But, though the epoxy resin itself is not harmful to the liquid crystal, an amine in a thermohardening solvent decomposes the liquid crystal. Thus, when using an epoxy resin for the seal pattern 2, the sealant formed through the screen-print method is pre-baked using a gradual change of baking temperature.

Hereinafter, referring to FIG. 3, the seal pattern itself is explained in detail.

Conventionally, to supply an electric field for the liquid crystal, electrode pads are formed over the lower substrate. A voltage is then supplied to the common electrode of the upper substrate by way of the electrode pads using electric conductors formed on the lower substrate. For the electric conductors, a silver paste (hereinafter referred to as a silver dot 10) is usually used.

As shown in FIG. 3, the silver dot 10 is formed outside of the seal pattern with respect to the display area A. Namely, the seal pattern 2 is formed along and on the substrate, but near the silver dot 10, and the seal pattern forms a rectangular shape to bypass the silver dot 10. Around the silver dot 10, the seal pattern 2 protrudes inward a length L. Light spots can occur in the display area A of the liquid crystal display device due to the amine included in the seal pattern 2.

Though the above-mentioned screen-print method is widely used due its convenience, the screen-print method can produce errors as a result of the contact between the screen and the orientation film formed over the substrate. Additionally, the screen-print method is not easily adopted to larger substrates.

Further, in the screen-print method, after the sealant is formed on the whole patterned screen, the squeegee rubs the sealant to form the seal pattern. Since the sealant is formed throughout the patterned screen, part of the sealant is wasted.

To overcome the above-mentioned problems, a dispenser-print method has gradually been adopted.

Referring to FIG. 4, in the dispenser-print method, a dispenser 20 is filled with the sealant. A substrate 1 is then located on a table. The dispenser 20 then moves over the table 100 as the dispenser dispenses sealant in the sealant pattern 2.

However, the dispenser-print method has poor quality when dispensing along a complex pattern. Therefore, the seal pattern 2 shown in FIG. 3 is difficult to reliably produce using the dispenser-print method.

SUMMARY OF THE INVENTION

In view of the foregoing and other problems, it is an object of the present invention to provide for small-bend seal patterns that decrease light spots in the display area of liquid crystal display devices.

Another object is to provide a small-bend seal pattern that is suitable for use with the dispenser-print technology.

Thus, to overcome the above-mentioned objects, the present invention provides a method of forming a seal pattern for a liquid crystal display panel having a liquid crystal layer. That method comprises forming a common electrode on a first substrate; forming a plurality of conductive contact dots on the second substrate; forming a seal pattern along edges of the second substrate, wherein the seal pattern includes a plurality of triangular bent portions which are bent toward the inside of the second substrate; joining the substrates; and injecting the liquid crystal layer between first and second substrates.

The foregoing and other objectives of the present invention will become more apparent from the detailed description given hereinafter. However, it should be understood that the detailed description and specific examples, while indicating preferred embodiments of the invention, are given by way of illustration only, since various changes and modifications that are within the spirit and scope of the invention will become apparent to those skilled in the art.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF ILLUSTRATED EMBODIMENTS

Figure 6:
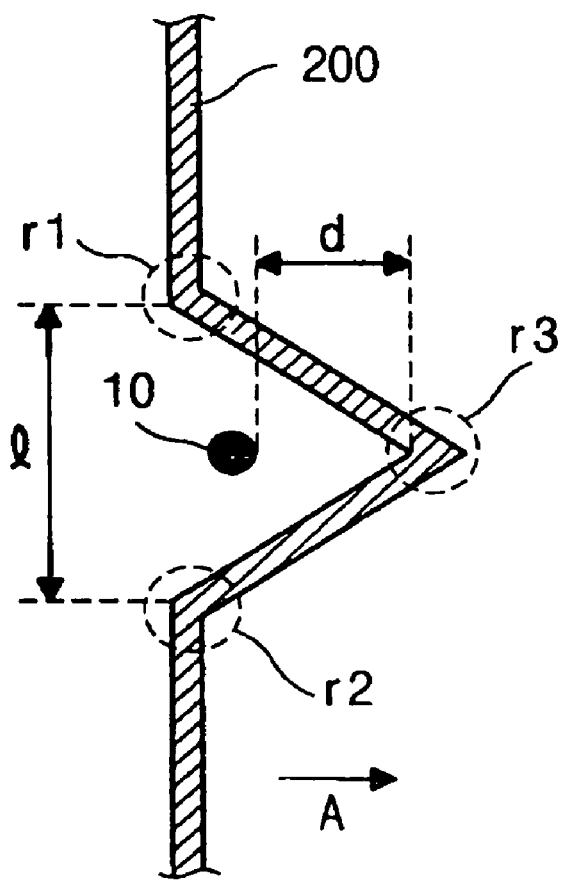
FIG. 6 is a plan view illustrating a seal pattern around a silver dot according to a first embodiment of the present invention.

Referring now to the drawings, and more particularly to FIG. 6, a first embodiment of the present invention will now be described.

FIG. 6 illustrates features of a seal pattern 200 according to the first embodiment of the present invention.

As shown in FIG. 6, around a silver dot 10, the seal pattern 200 has an open-sided triangular bent portion that bypasses and surrounds the silver dot 10 with a vertex that is opposite to the open-side. The vertex is protruded toward a display area "A". The triangular shape of the seal pattern 200 decreases the area of the protruding portion of the seal pattern in comparison with the rectangular bend of the conventional seal pattern.

Further, the triangular shape of the seal pattern 200 decreases the number of bends so that the dispenser-print method is better able to print the seal pattern.

In the seal pattern 200 according to the first embodiment of the present invention, the triangular bend has a first vertex "r1", a second vertex "r2", and a third vertex "r3" that are all rounded, as will be explained with the assistance of FIG. 5. Otherwise, at the vertexes in the seal pattern, cuttings or line-opens can occur during the dispenser printing.

More specifically, the distance "d" between the silver dot 10 and the third vertex "r3" is preferably 0.1 to 1 millimeters (mm); the distance "λ" between the first and the second vertexes "r1" and "r2" is preferably 5 to 20 mm.

Figure 1:
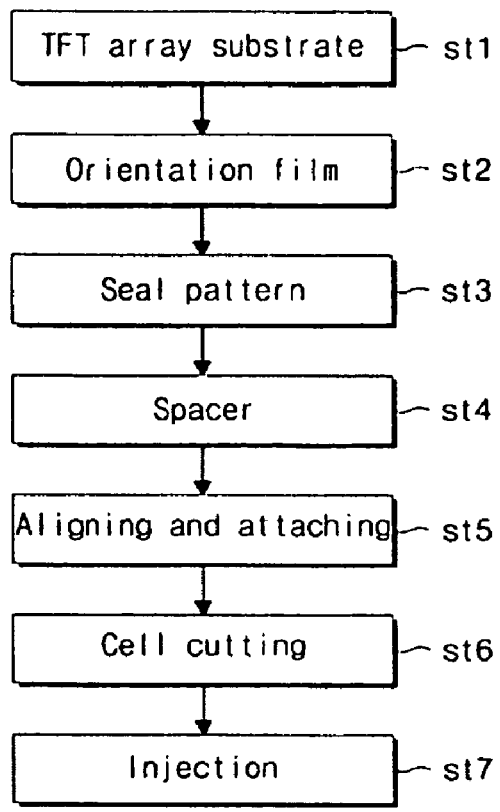
FIG. 1 is a block diagram illustrating a typical manufacturing process for a liquid crystal cell.
Figure 2:
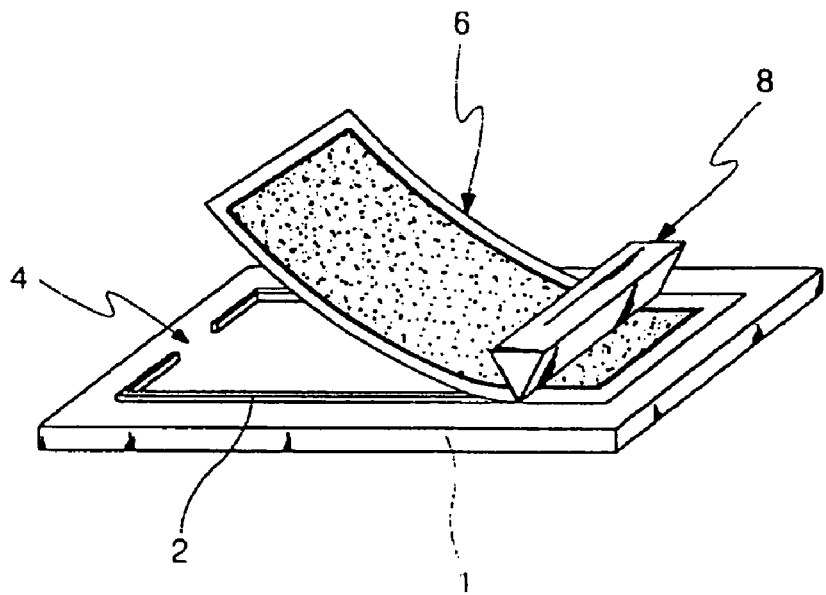
FIG. 2 is a perspective view illustrating a seal pattern process with a screen-print method.
Figure 3:
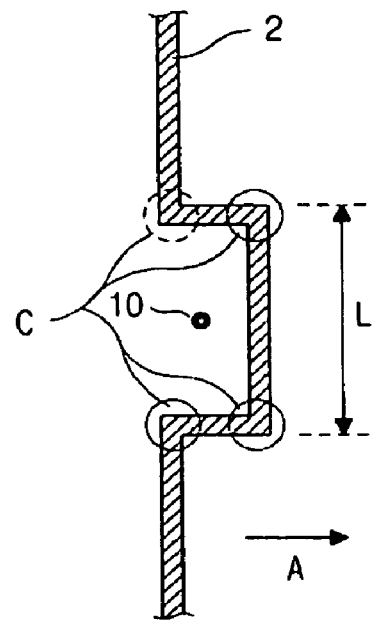
FIG. 3 is a plan view illustrating a seal pattern around a silver dot.
Figure 4:
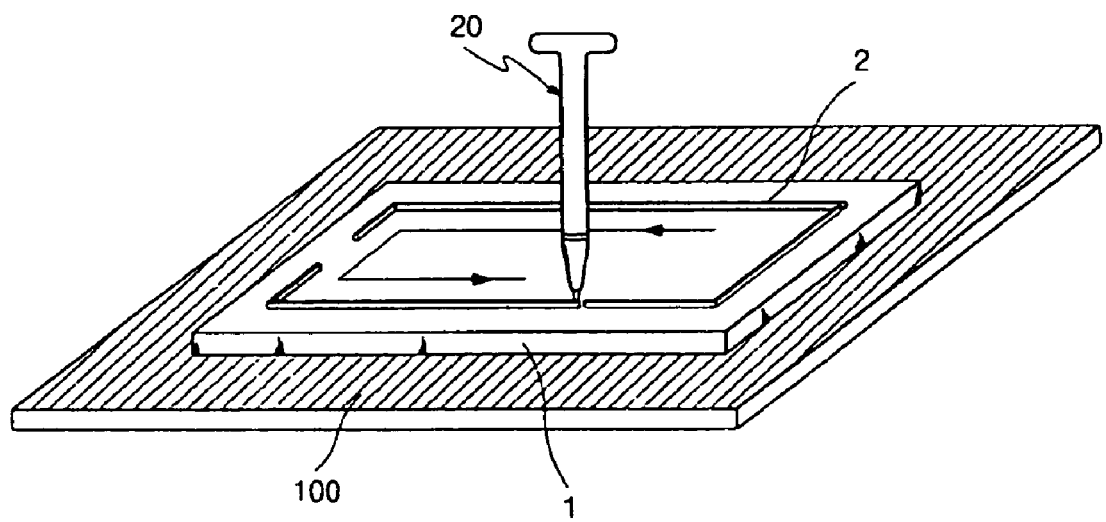
FIG. 4 is a perspective view illustrating a dispenser-print method for a seal pattern.
Figure 5:
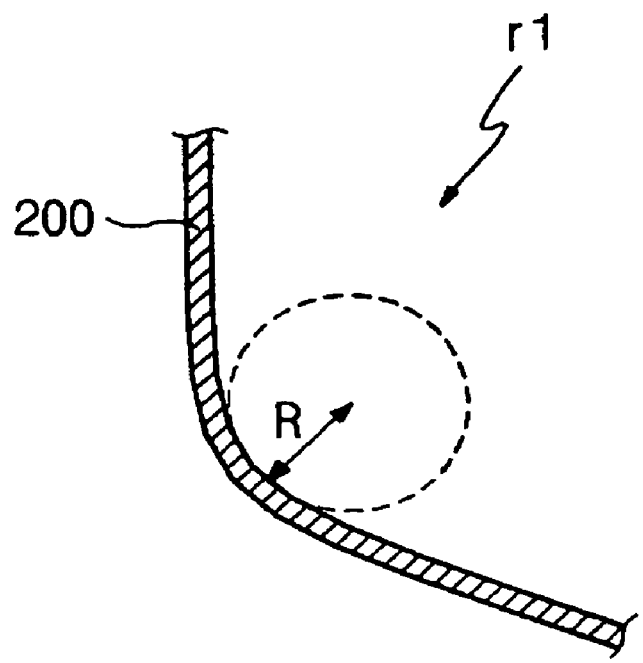
FIG. 5 is an expanded plan view of "r1" of FIG. 6.

FIG. 5 illustrates an expansion of the first vertex "r1" having a turning radius "R". The turning radius "R" of vertex "r1" is preferably 0.5 to 5 mm. The turning radius in the first vertex "r1" is also that of the second and third vertexes. Namely, the second and third vertexes also have the same roundness.

However, the seal pattern according to the first embodiment of the present invention is not limited to the structure of the above-described triangular bend.

Figure 7:
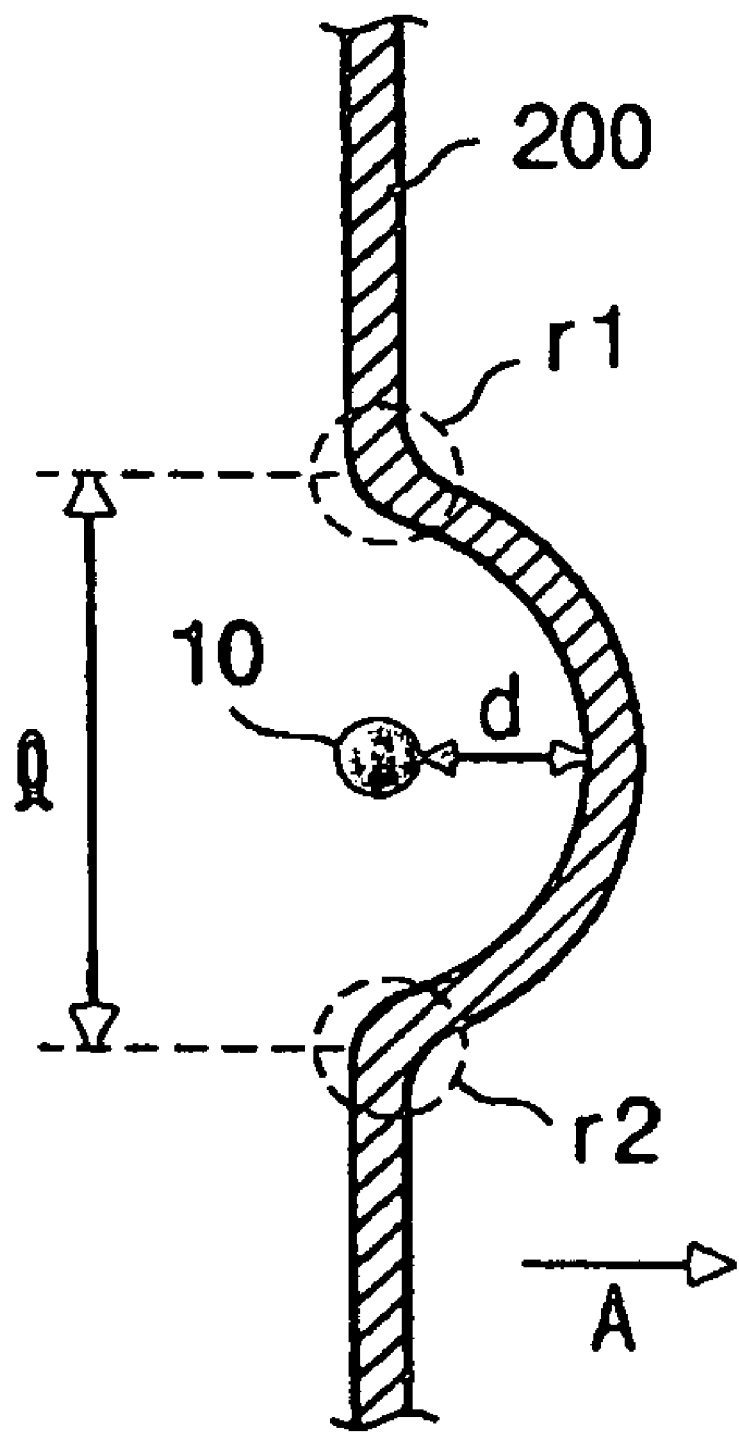
FIG. 7 is a plan view illustrating a seal pattern around the silver dot according to a second embodiment of the present invention.

That is to say, referring to FIG. 7, as a modification of the first embodiment of the present invention, instead of the triangular bent portion, the seal pattern 200 has a circular or an elliptical bent portion that surrounds the silver dot 10 and that has two rounded vertexes "r1" and "r2". The turning radius of the rounded vertexes "r1" and "r2" is also beneficially 0.5 to 5 mm like the vertexes of the triangular bent portion.

As described above with reference to FIGS. 5 to 7, the triangular, circular, or elliptical bend of the seal pattern 200 according to the preferred embodiment decreases the display-area-penetrating portion of the seal pattern so as to minimize light spots on the display area around the silver dots.

Further, in comparison with the conventional rectangular bent portion, due to the decrease of the number and angles of bent points in the bent portions such as the vertexes, the dispenser-print method can be used to apply the seal pattern without denigration of printing quality.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A method of forming a liquid crystal display panel, comprising:
    forming a common electrode on a first substrate;
    forming a plurality of conductive contact dots on a second substrate;
    forming a seal pattern on the second substrate, the seal pattern having a plurality of triangular bent portions each having an open side and a vertex opposite the open side, the vertex directed toward a display area of the second substrate, wherein each triangular bent portion circumvents a conductive contact dot;
    assembling the first substrate and the second substrate; and
    forming a liquid crystal layer between the first and second substrates.

2. The method according to claim 1, wherein the conductive contact dot comprises a silver (Ag).

3. The method according to claim 1, wherein the triangular bent portions each include a first vertex, a second vertex, and a third vertex.

4. The method according to claim 3, wherein the first vertex, the second vertex, and the third vertex all have a rounded shape that is defined by a radius.

5. The method according to claim 4, wherein the radius is about 0.5 to about 2 millimeters.

6. The method according to claim 4, wherein a distance between the first vertex and the second vertex is about 5 to about 20 millimeters.

7. The method according to claim 4, wherein a distance between the conductive contact dot and the third vertex is about 0.1 to about 1 millimeters.

8. The method according to claim 1, wherein the seal pattern is formed by a dispenser.

9. The method according to claim 1, wherein the display region is defined within a closed formation of the seal pattern.

10. The method according to claim 9, wherein the conductive contact dot is located outside the display region.

11. The method according to claim 1, wherein the conductive contact dot is located outside the display region.

12. A method of forming a liquid crystal display panel, comprising:
    forming a common electrode on a first substrate;
    forming a plurality of conductive contact dots on a second substrate;
    forming a seal pattern on the second substrate, the seal pattern having a plurality of triangular bent portions that each have a vertex that is directed toward an inside of the second substrate, wherein each triangular bent portion circumvents a conductive contact dot;
    assembling the first substrate and the second substrate; and
    forming a liquid crystal layer between the first and second substrates,
    wherein the triangular bent portions each include a first vertex, a second vertex and a third vertex,
    wherein the first vertex, the second vertex, and the third vertex all have a rounded shape that is defined by the radius and wherein the radius is 0.5 to 2 millimeters.

13. A method of forming a liquid crystal display panel, comprising:
    forming a common electrode on a first substrate;
    forming a plurality of conductive contact dots on a second substrate;
    forming a seal pattern on the second substrate, the seal pattern having a plurality of triangular bent portions that each have a vertex that is directed toward an inside of the second substrate, wherein each triangular bent portion circumvents a conductive contact dot;
    assembling the first substrate and the second substrate; and
    forming a liquid crystal layer between the first and second substrates,
    wherein the triangular bent portions each include a first vertex, a second vertex and a third vertex,
    wherein the first vertex, the second vertex, and the third vertex all have a rounded shape that is defined by the radius and wherein a distance between the first vertex and the second vertex is about 5 to about 20 millimeters.

14. A method of forming a liquid crystal display panel, comprising:
    forming a common electrode on a first substrate;
    forming a plurality of conductive contact dots on a second substrate;
    forming a seal pattern on the second substrate, the seal pattern having a plurality of triangular bent portions that each have a vertex that is directed toward an inside of the second substrate, wherein each triangular bent portion circumvents a conductive contact dot;
    assembling the first substrate and the second substrate; and
    forming a liquid crystal layer between the first and second substrates,
    wherein the triangular bent portions each include a first vertex, a second vertex and a third vertex,
    wherein the first vertex, the second vertex, and the third vertex all have a rounded shape that is defined by the radius, and
    wherein a distance between the conductive contact dot and the third vertex is about 0.1 to about 1 millimeter.

15. A method of forming a liquid crystal display panel, comprising:
    forming a common electrode on a first substrate;
    forming a plurality of conductive contact dots on the second substrate;
    forming a seal pattern on the second substrate, the seal pattern having a plurality of semicircular bent portions, the semicircular bent portions each having an open portion and an arc portion opposite the open portion, the arc portion being closer to a display region of the second substrate than the open portion, wherein each semicircular bent portion circumvents a conductive contact dot;

assembling the first substrate and the second substrate; and forming a liquid crystal layer between first and second substrates, wherein the semicircular portion has a radius of about 2.5 to about 10 millimeters.

16. The method according to claim 15, wherein the display region is defined within a closed formation of the seal pattern.

17. The method according to claim 16, wherein the conductive contact dot is located outside the display region.

18. The method according to claim 15, wherein the conductive contact dot is located outside the display region.

19. A method of forming a liquid crystal display panel, comprising:

forming a common electrode on a first substrate;

forming a plurality of conductive contact dots on the second substrate;

forming a seal pattern on the second substrate, the seal pattern having a plurality of semicircular bent portions, the semicircular bent portions being bent toward an inside of the second substrate wherein each semicircular bent portion circumvents a conductive contact dot;

assembling the first substrate and the second substrate; and forming a liquid crystal layer between first and second substrates wherein each of the two ends of the semicircular portion has a radius of about 0.5 to about 2 mm.

20. A method of forming a liquid crystal display panel, comprising:

forming a common electrode on a first substrate;

forming a plurality of conductive contact dots on the second substrate;

forming a seal pattern on the second substrate, the seal pattern having a plurality of semicircular bent portions, the semicircular bent portions being bent toward an inside of the second substrate wherein each semicircular bent portion circumvents a conductive contact dot;

assembling the first substrate and the second substrate; and forming a liquid crystal layer between first and second substrates wherein the semicircular portion has a radius of about 2.5 to about 10 millimeters.

21. A method of forming a liquid crystal display panel, comprising:

forming a common electrode on a first substrate;

forming a plurality of conductive contact dots on the second substrate;

forming a seal pattern on the second substrate, the seal pattern having a plurality of semicircular bent portions, the semicircular bent portions being bent toward an inside of the second substrate wherein each semicircular bent portion circumvents a conductive contact dot;

assembling the first substrate and the second substrate; and forming a liquid crystal layer between first and second substrates wherein a distance between the conductive contact dot and the semicircular portion is about 0.1 to about 1 millimeter.

22. A method of forming a liquid crystal display panel, comprising:

forming a common electrode on a first substrate;

forming a plurality of conductive contact dots on the second substrate;

forming a seal pattern on the second substrate, the seal pattern having a plurality of semicircular bent portions, the semicircular bent portions each having an open portion and an arc portion opposite the open portion, the arc portion being closer to a display region of the second substrate than the open portion, wherein each semicircular bent portion circumvents a conductive contact dot;

assembling the first substrate and the second substrate; and forming a liquid crystal layer between first and second substrates, wherein each of the two ends of the semicircular portion has a radius of about 0.5 to about 2 mm.

23. A method of forming a liquid crystal display panel, comprising:

forming a common electrode on a first substrate;

forming a plurality of conductive contact dots on the second substrate;

forming a seal pattern on the second substrate, the seal pattern having a plurality of semicircular bent portions, the semicircular bent portions each having an open portion and an arc portion opposite the open portion, the arc portion being closer to a display region of the second substrate than the open portion, wherein each semicircular bent portion circumvents a conductive contact dot;

assembling the first substrate and the second substrate; and forming a liquid crystal layer between first and second substrates, wherein a distance between the conductive contact dot and the semicircular portion is about 0.1 to about 1 millimeter.

* * * * *